(12) United States Patent
Hsiao et al.

(10) Patent No.: US 9,183,853 B2
(45) Date of Patent: Nov. 10, 2015

(54) MAGNETIC WRITE HEAD HAVING A STACKED COIL ARCHITECTURE FOR HIGH DATA RATE PERFORMANCE

(71) Applicant: HGST Netherlands B.V., Amsterdam (NL)

(72) Inventors: Wen-Chien David Hsiao, San Jose, CA (US); Quan-chiu Harry Lam, San Jose, CA (US); Edward Hin Pong Lee, San Jose, CA (US); Guomin Mao, San Jose, CA (US); Yi Zheng, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/867,019

(22) Filed: Apr. 19, 2013

(65) Prior Publication Data

US 2014/0313614 A1 Oct. 23, 2014

(51) Int. Cl.
*G11B 5/127* (2006.01)
*G11B 5/17* (2006.01)
*G11B 5/187* (2006.01)
*G11B 5/31* (2006.01)

(52) U.S. Cl.
CPC ............... *G11B 5/17* (2013.01); *G11B 5/1278* (2013.01); *G11B 5/3123* (2013.01); *G11B 5/3163* (2013.01); *Y10T 29/49048* (2015.01)

(58) Field of Classification Search
CPC ...... G11B 5/127; G11B 5/1278; G11B 5/147; G11B 5/17; G11B 5/187; G11B 5/23; G11B 5/31; G11B 5/3109; G11B 5/313
USPC ............. 360/123.02, 123.05, 123.06, 123.08, 360/123.04, 125.02, 125.03, 125.16, 125.24
See application file for complete search history.

(56) References Cited

U.S. PATENT DOCUMENTS

| | | | |
|---|---|---|---|
| 7,116,518 B2 | 10/2006 | Han et al. | |
| 7,268,975 B2 | 9/2007 | Han et al. | |
| 7,667,927 B2 | 2/2010 | Kobayashi et al. | |
| 7,729,084 B2 | 6/2010 | Bedell et al. | |
| 8,035,921 B2* | 10/2011 | Sunwoo | 360/123.05 |
| 8,218,263 B2 | 7/2012 | Allen et al. | |
| 8,300,357 B1* | 10/2012 | Sasaki et al. | 360/123.06 |
| 8,693,761 B2* | 4/2014 | Haake et al. | 382/131 |
| 8,797,684 B1* | 8/2014 | Tran et al. | 360/123.06 |
| 2006/0065620 A1 | 3/2006 | Lee et al. | |
| 2008/0316646 A1* | 12/2008 | Na et al. | 360/123.05 |
| 2012/0170429 A1 | 7/2012 | Zhou et al. | |
| 2012/0262825 A1* | 10/2012 | Sasaki et al. | 360/244 |
| 2013/0176644 A1* | 7/2013 | Sasaki et al. | 360/245.3 |

* cited by examiner

Primary Examiner — Jefferson Evans
(74) Attorney, Agent, or Firm — John D. Henkhaus

(57) ABSTRACT

Approaches for a magnetic write head having a stacked coil architecture. Embodiments utilize the better process control capability available with thin films' thicknesses, compared to the control capability of vertical gap-filling processes, which provides for better scalability to shorter yoke length magnetic write heads, which are faster at writing data bits than are magnetic write heads having a longer yoke length.

22 Claims, 11 Drawing Sheets

MAGNETIC WRITE HEAD HAVING A STACKED COIL ARCHITECTURE FOR HIGH DATA RATE PERFORMANCE

FIELD OF THE INVENTION

Embodiments of the invention relate generally to perpendicular magnetic recording and more particularly to a write pole having a stacked coil architecture for high data rate performance.

BACKGROUND

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head, which is housed in a slider, and the surface of a magnetic-recording disk must be tightly controlled. An actuator relies in part on a suspension's force on the slider and on the aerodynamic characteristics of the slider air bearing surface (ABS) to provide the proper distance between the read/write head and the surface of the magnetic-recording disk (the "flying height") while the magnetic-recording disk rotates. A slider therefore is said to "fly" over the surface of the magnetic-recording disk.

FIG. 2 is a cross-sectional side view of a conventional write head. Write heads make use of the electricity flowing through a coil 202 in the write head 200, which produces a magnetic field. One type of coil design is referred to as a helical coil because it wraps around the write poles, i.e., main pole 204, in a helical shape. Such a write head includes a helical write coil having upper coil portions 202a, 202b, 202c that pass above the write pole and lower coil portions 202d, 202e, 202f that pass below the write pole. The upper and lower coil portions are connected with one another by connection studs. Electrical pulses are sent to the write head, with different patterns of positive and negative currents. The current in the coil of the write head induces a magnetic field across the gap between the head and the magnetic disk, which in turn magnetizes a small area on the recording medium.

A perpendicular magnetic recording (PMR) system records data as magnetizations oriented perpendicular to the plane of the magnetic-recording disk. The magnetic disk has a magnetically soft underlayer covered by a thin magnetically hard recording layer. The perpendicular write head has a write pole (main pole 204) with a very small cross section at the pole tip 208a, tapered down from the cross section along the length of the yoke 208b, a lower return pole 206, and an upper return pole 218 having a much larger cross section along the length. Also shown in FIG. 2 is a wrap-around shield 209, for assisting in focusing the magnetic field emitting from pole tip 208a, and a back gap 203. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

Advanced PMR writers demand high data rate write heads, especially for advanced server products. For high data rate performance, a shorter yoke length write head is faster in writing data bits, for the same total write current. Thus, the shorter the yoke length, and the higher the total current going through the coil turns, the faster the write head. However, in conventional write heads, yoke length reduction is challenging in part because manufacturing conventional coil structures involves filling in insulating material into the gaps 210a, 210b and 210c, 210d between coil turns 202a, 202b, 202c and 202d, 202e, 202f, respectively. As the yoke length decreases, the height-to-width aspect ratio of such gaps typically increases, making the insulator fill process all the more problematic.

SUMMARY OF EMBODIMENTS OF THE INVENTION

As discussed, magnetic write heads having a shorter yoke length are more efficient and faster at writing data bits than are magnetic write heads having a longer yoke length. Further, for coil turns carrying the same amount of current, coil turns closer to the main pole tip are more effective at driving the pole than coil turns farther back from the pole tip.

Embodiments of the invention are directed towards a magnetic write head having a stacked coil architecture. Embodiments utilize the better process control capability available with thin films' thicknesses, compared to the control capability of vertical gap-filling processes, which provide for better scalability to shorter yoke length magnetic write heads.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to the configuration and the manufacturing process for a stacked coil magnetic write head, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
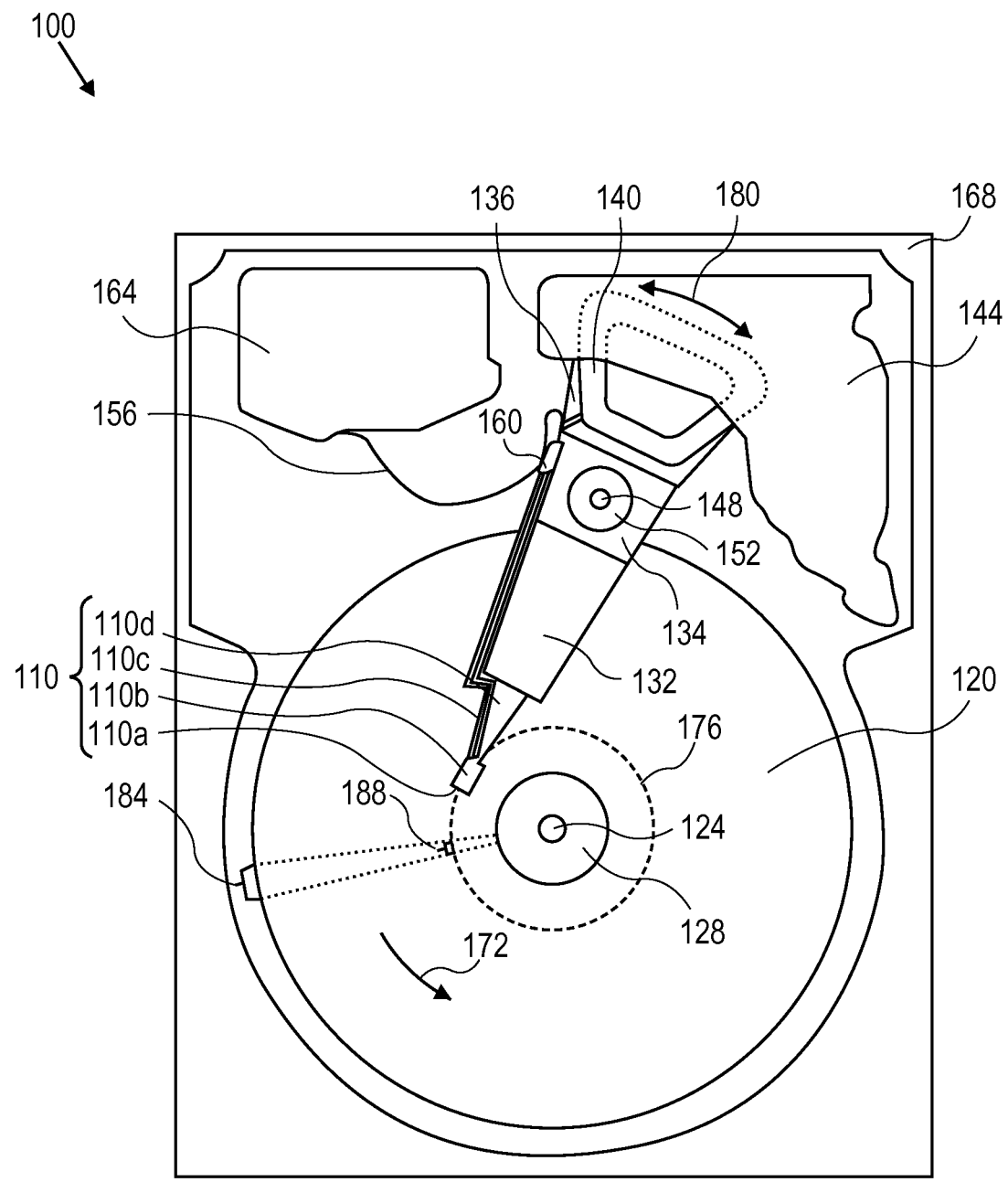
FIG. 1 is a plan view of an HDD, according to an embodiment of the invention.

Embodiments of the invention may be used in the context of the manufacturing and use of a magnetic writer for a hard-disk drive (HDD). In accordance with an embodiment of the invention, a plan view of a HDD 100 is shown in FIG. 1. FIG. 1 illustrates the functional arrangement of components of the HDD including a slider 110*b* that includes a magnetic-reading/recording head 110*a*. Collectively, slider 110*b* and head 110*a* may be referred to as a head slider. The HDD 100 includes at least one head gimbal assembly (HGA) 110 including the head slider, a lead suspension 110*c* attached to the head slider, and a load beam 110*d* attached to the lead suspension 110*c*. The HDD 100 also includes at least one magnetic-recording disk 120 rotatably mounted on a spindle 124 and a drive motor (not shown) attached to the spindle 124 for rotating the disk 120. The head 110*a* includes a write element and a read element for respectively writing and reading information stored on the disk 120 of the HDD 100. The disk 120 or a plurality (not shown) of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown). The armature 136 of the VCM is attached to the carriage 134 and is configured to move the arm 132 and the HGA 110 to access portions of the disk 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

With further reference to FIG. 1, in accordance with an embodiment of the present invention, electrical signals, for example, current to the voice coil 140 of the VCM, write signal to and read signal from the head 110*a*, are provided by a flexible interconnect cable 156 ("flex cable"). Interconnection between the flex cable 156 and the head 110*a* may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110*b* rides so that the slider 110*b* flies above the surface of the disk 120 without making contact with a thin magnetic-recording medium of the disk 120 in which information is recorded.

The electrical signal provided to the voice coil 140 of the VCM enables the head 110*a* of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of stacked tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110*a* of the HGA 110 reads the servo-burst-signal pattern which provides a position-error-signal (PES) to the servo electronics, which controls the electrical signal provided to the voice coil 140 of the VCM, enabling the head 110*a* to follow the track 176. Upon finding the track 176 and identifying a particular sectored track portion 188, the head 110*a* either reads data from the track 176 or writes data to the track 176 depending on instructions received by the disk controller from an external agent, for example, a microprocessor of a computer system.

Magnetic Write Head Stacked Coil Architecture

As mentioned, a shorter yoke-length write head is faster in writing data bits for the same total write current. Thus, the shorter the yoke length, the faster the write head. However, in conventional write heads, yoke length reduction is challenging in part because manufacturing conventional coil structures involves filling in insulating material in between coil turns and between the coil and upper return pole and as the yoke length decreases, the height-to-width aspect ratio of such insulating material typically increases, making the insulator fill process all the more problematic. Furthermore, coil turns closer to the main pole tip, or ABS, are more effective than coil turns farther back away from the pole tip. Thus, for a coil turn carrying the same amount of current, the closer the coil is to the pole tip the more efficient the coil is at driving the pole tip.

A First Stacked Coil Configuration

Figure 2:
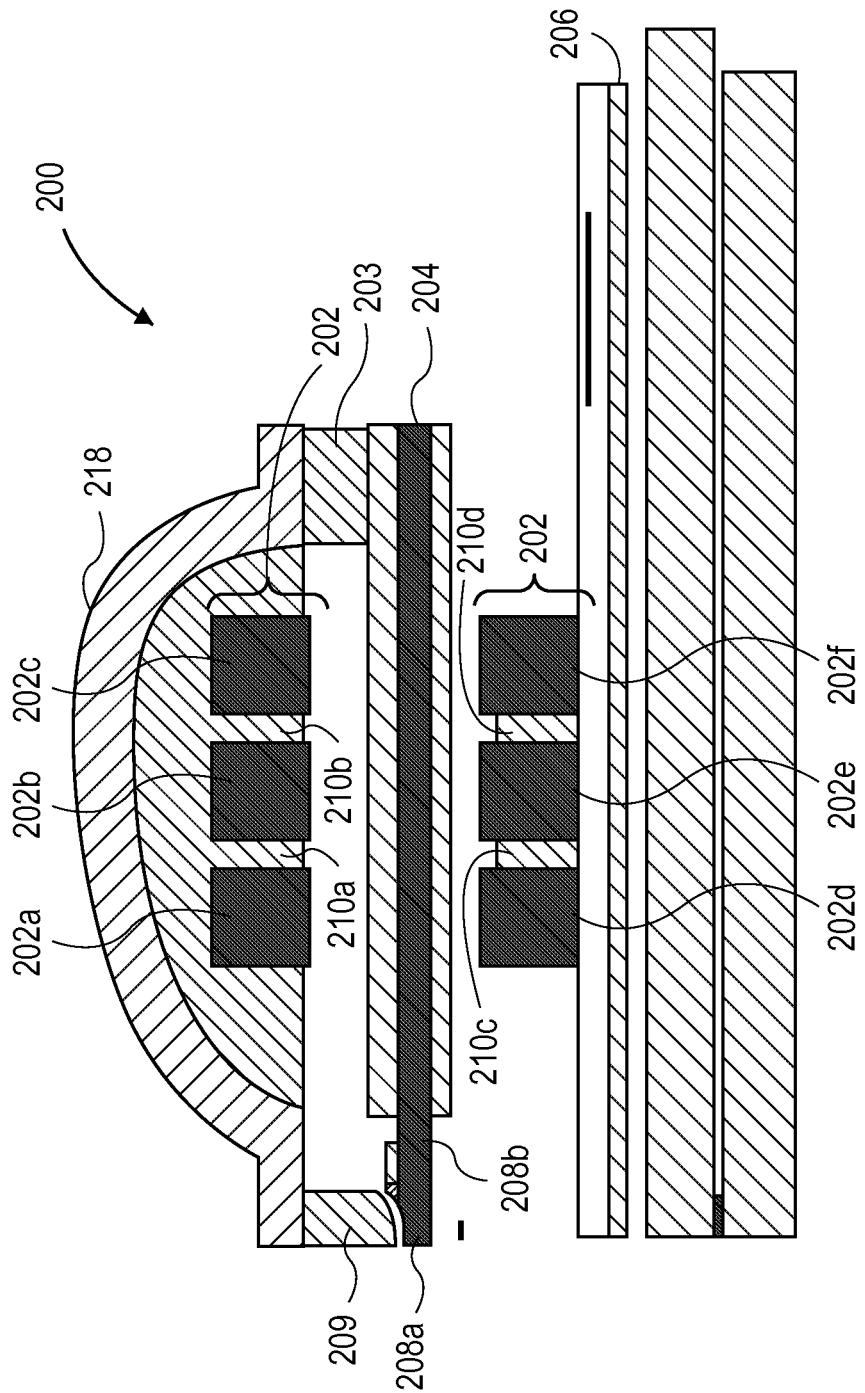
FIG. 2 is a cross-sectional side view of a conventional write head.
Figure 3:
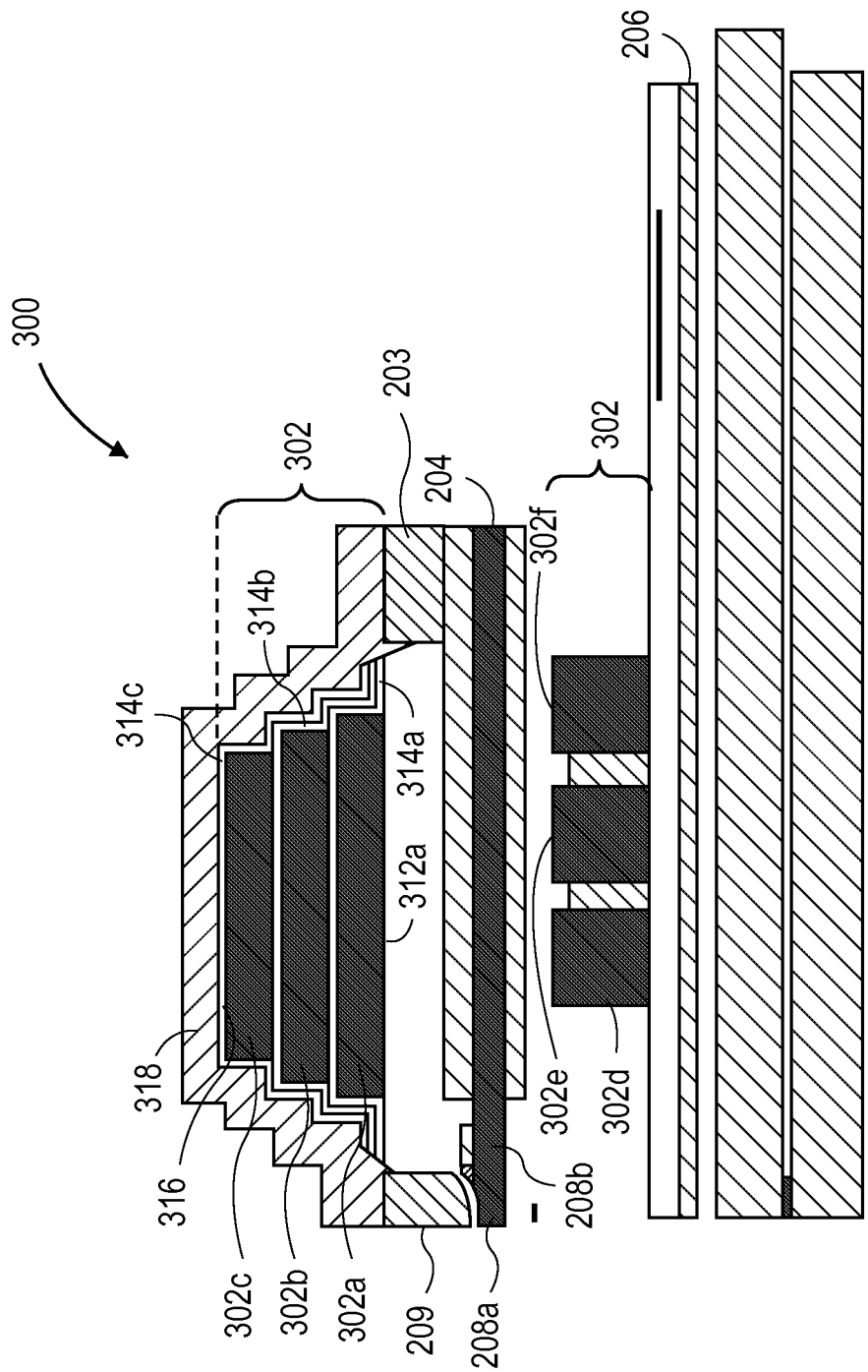
FIG. 3 is a cross-sectional side view of an upper stacked coil magnetic writer, according to a first embodiment of the invention.

FIG. 3 is a cross-sectional side view of an upper stacked coil magnetic writer, according to a first embodiment of the invention. A magnetic writer having a stacked coil takes advantage of the better process control capability available with thin film thicknesses, compared to the control capability of vertical gap filling processes. This provides a coil architecture that is easier to scale down to shorter yoke-length write poles. Further, a stacked coil architecture offers more design freedom to concentrate more current density to the front of the main pole, in comparison with the conventional write head 200 of FIG. 2 in which the coil turns are spread out helically along the length of the main pole, which further enhances the high data rate writing capabilities of the write head.

Magnetic writer 300 comprises a main pole 204 having a pole tip 208a and a yoke 208b, a lower return pole 206, an upper return pole 318, and a stacked coil 302. Stacked coil 302 comprises a plurality of upper stacked coil portions 302a, 302b, 302c, and a plurality of lower coil portions 302d, 302e, 302f. Three upper and lower coil turns are depicted in FIG. 3 for purposes of explanation, however, embodiments of the invention are not limited to three coil turns, and the number of coil turns may vary from implementation to implementation.

Upper coil portions 302a, 302b, 302c are referred to as a "stacked" configuration, because each successive coil turn in the direction away from the main pole is stacked on the preceding coil turn which is closer to the main pole. Therefore, successive layers of one or more coil turn are supported by a preceding layer of one or more coil turn, with a layer of alumina insulation (e.g., atomic layer deposited) between each layer of coil, providing a structural foundation for successively manufactured layer(s) of one or more coil turn. Not only does this stacked configuration provide a practical, readily manufacturable configuration for a short yoke length write head, because it can be configured to need and use less space along the direction of the main pole toward the ABS, but it also concentrates more of the coil structure (and, thus, more current) closer to the main pole tip 208a than does the conventional coil configuration shown in FIG. 2. Both of the foregoing features provide for a higher data rate, i.e., faster, write head in comparison with the coil configuration shown in FIG. 2.

Manufacturing a Magnetic Write Head Stacked Coil

Figure 4:
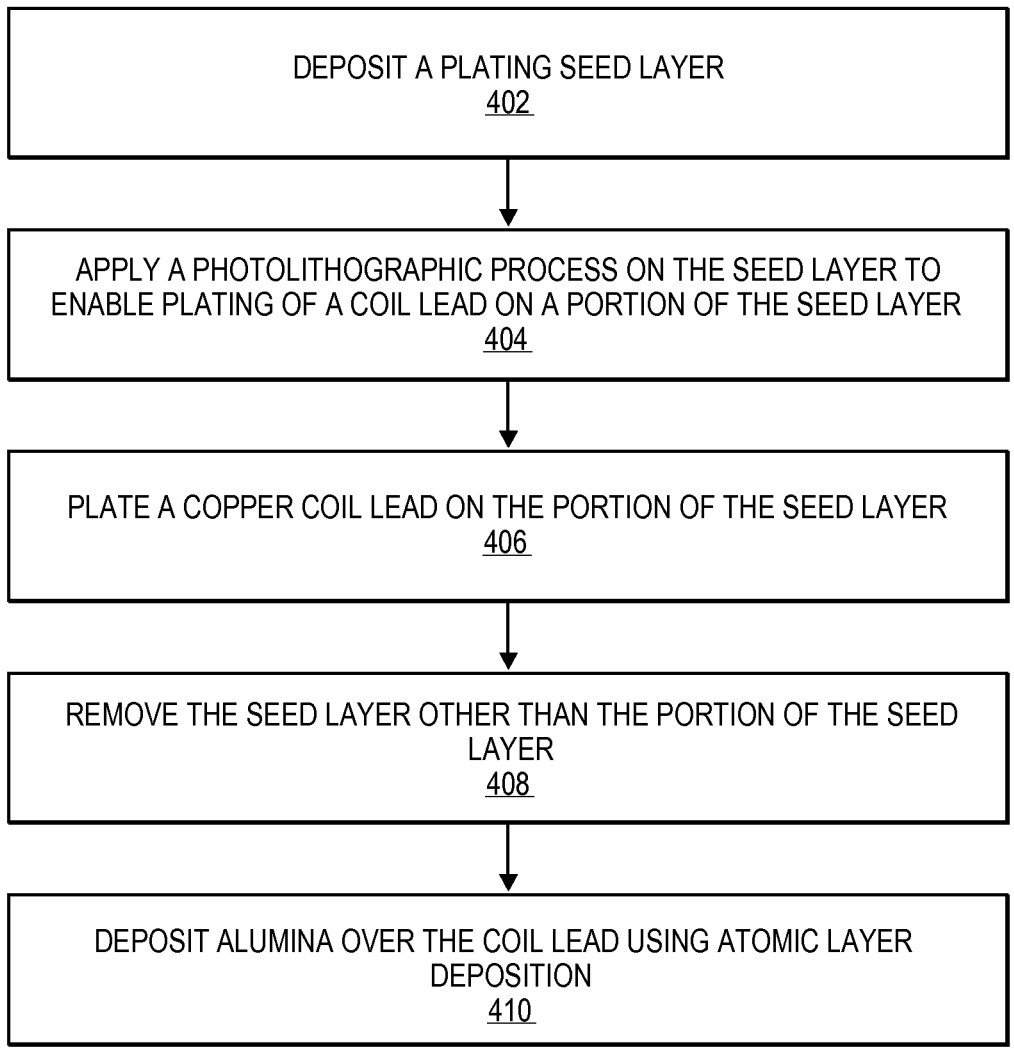
FIG. 4 is a flow diagram illustrating a method of manufacturing a stacked coil magnetic writer having upper stacked coil portions, according to a first embodiment of the invention.
Figure 5:
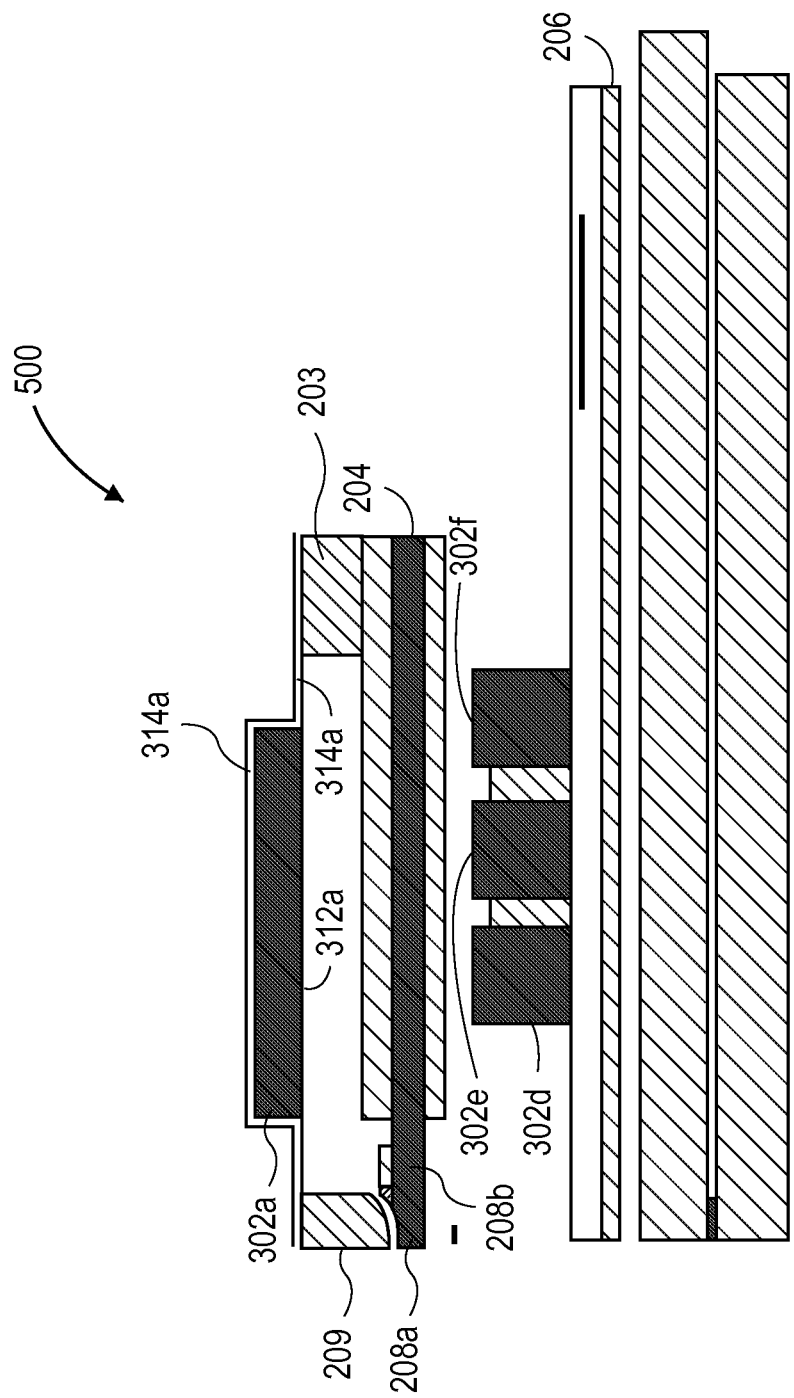
FIG. 5 is a cross-sectional side view of a first stage of an upper stacked coil magnetic writer, according to the first embodiment of the invention.

FIG. 4 is a flow diagram illustrating a method of manufacturing a stacked coil magnetic writer having upper stacked coil portions, according to a first embodiment of the invention. FIG. 5 is a cross-sectional side view of a first stage of an upper stacked coil magnetic writer, according to the first embodiment of the invention. Having introduced the concept of a stacked coil architecture for a magnetic write head, in reference to magnetic writer 300 of FIG. 3, a method for manufacturing such a stacked coil is now described with reference to FIG. 4 and the partial writer 500 of FIG. 5. Conventional techniques may be used for the manufacturing of the read head, the lower return pole 206, and lower coil portions 302d, 302e, 302f.

At block 402, a plating seed layer is deposited. For example, an electrically conductive seed layer 312a (FIG. 5), such as copper or gold, is deposited to provide electrical conducting layer for the subsequent plating process.

At block 404, a photolithographic process is applied on the seed layer (e.g., seed layer 312a of FIG. 5), to enable the plating of a coil lead (also referred to herein as a "coil portion"), on a portion of the seed layer.

As known in the art, photolithography is a process used to pattern parts of a thin film or the bulk of a substrate. The photolithography process uses light to transfer a pattern from a photomask to a light-sensitive chemical photoresist on the substrate. A series of chemical treatments then either engraves the exposure pattern into the material or enables deposition of a new material in the desired pattern. Here, the photolithographic process is utilized to define the shape, or footprint, of the coil lead that is subsequently plated (e.g., at block 406).

At block 406, copper coil is plated through the defined pattern. For example, upper coil portion 302a (FIG. 5) is plated onto the portion of the seed layer 312a (FIG. 5).

At block 408, the remainder of the seed layer applied at block 402 is removed. That is, the seed layer 312a (FIG. 5), in the area that was not plated, is now removed. For example, ion milling or sputter etching processes may be utilized to remove the remainder of the seed layer that was used for electrical connection for the copper plating process.

At block 410, alumina is deposited over the coil lead using atomic layer deposition (ALD) process. For example, an alumina (aluminum oxide) layer 314a (FIG. 5) is deposited over upper coil portion 302a (FIG. 5), using ALD process. Consequently, there is now an alumina insulation layer between upper coil portion 302a and any subsequent layers of writer 300 (FIG. 3), such as a subsequent seed layer for plating upper coil portion 302b (FIG. 3).

As known in the art, atomic layer deposition is a thin film deposition technique that is based on the sequential use of a gas phase chemical process. ALD is a self-limiting (the amount of film material deposited in each reaction cycle is constant), sequential surface chemistry that deposits conformal thin-films of materials onto substrates of varying compositions.

Next, the alumina is then removed from areas in which it is undesirable, such as areas that will serve as contact areas to the lower coils, and for an upper return pole (see upper return pole 318 of FIG. 3), such as the area above wrap-around shield (WAS) 209 and the area of the back gap 203 (FIG. 3).

After this first stage of the manufacturing process of writer 300 (FIG. 3), the apparatus is now in the form of partial writer 500 of FIG. 5. To lay down any additional stacked upper coil portions, such as upper coil portion 302b and upper coil portion 302c (FIG. 3), a similar process as that depicted in FIG. 4 follows. As such, a second plating seed layer is deposited over the alumina layer 314a (similar to block 402) and a photolithographic process is applied to this second seed layer to enable plating of upper coil portion 302b on a portion of the second seed layer (similar to blocks 404 and 406). Similarly, the remainder of the seed layer is removed (similar to block 408), and an alumina layer 314b is deposited over the coil lead 302b using atomic layer deposition (ALD) process (similar to block 410). The alumina layer is then removed from the contact area to the lower coil and the upper return pole.

Returning to FIG. 3, likewise, to manufacture upper coil portion 302c stacked on top of upper coil portion 302b, similar steps to blocks 402-410 (FIG. 4) are performed. Each upper coil portion 302a, 302b, 302c is connected to one or more corresponding lower coil portion 302d, 302e, 302f via one or more electrically conductive tab, thereby completing an electrically contiguous coil structure. Additionally, at least two of the coil portions 302a, 302b, 302c, 302d, 302e, 302f are connected to a lead for electrically connecting with a slider electrical connection pad.

Once upper coil portion 302c is plated and covered in alumina layer 314c, then upper return pole 318 is manufactured. According to an embodiment, to manufacture the upper return pole 318, the alumina is removed from the area above wrap-around shield (WAS) 209 and the area of the back gap 203. A NiFe plating seed layer 316 is deposited over alumina layer 314c and a photolithographic process applied to the seed layer 316 to prepare it for the plating process. A soft magnetic, conformal, upper return pole 318 is then plated over the seed layer 316, with upper return pole 318 having contact areas with WAS 209 and back gap 203, thus completing writer 300. Use of ALD process for the alumina layers, compared to RF sputtering, provides for highly conformal alumina layers 314a, 314b, 314c and, likewise, for a highly conformal upper return pole 318. The highly conformal upper return pole 318 provides an optimally short return path for the magnetic flux which further enhances the write data rate of writer 300. Consequently, the write data rate performance of magnetic writer 300 should be expected to exceed the write data rate of conventional writer 200 (FIG. 2).

A Second Stacked Coil Configuration

Figure 6:
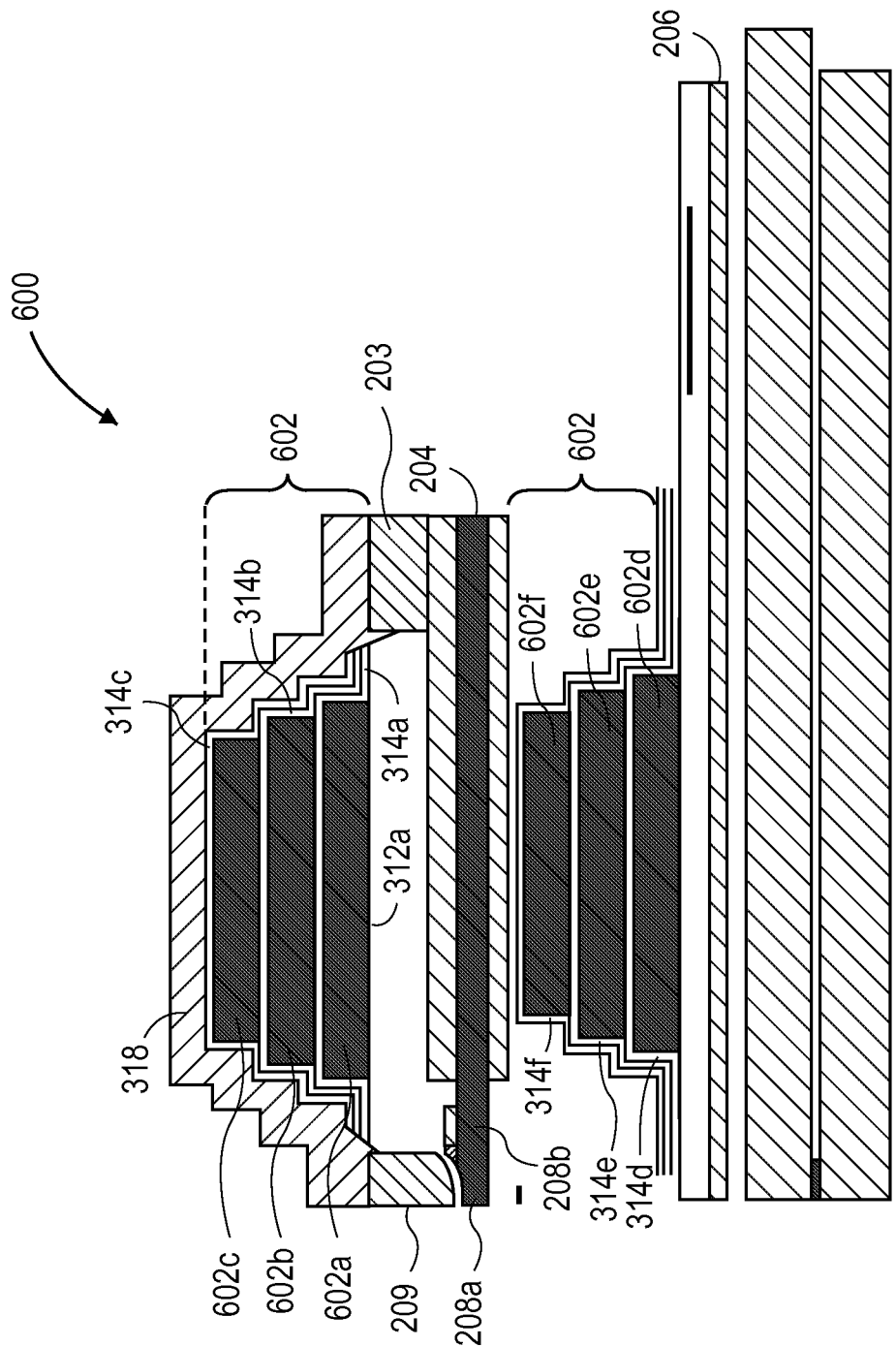
FIG. 6 is a cross-sectional side view of an upper and lower stacked coil magnetic writer, according to a second embodiment of the invention.

FIG. 6 is a cross-sectional side view of an upper and lower stacked coil magnetic writer, according to a second embodiment of the invention. Similarly to magnetic writer 300 (FIG. 3), magnetic writer 600 comprises a main pole 204 having a pole tip 208a and a yoke 208b, a lower return pole 206, an upper return pole 318, and a stacked coil 602. However, stacked coil 602 comprises a plurality of stacked upper coil portions 602a, 602b, 602c, as well as a plurality of stacked lower coil portions 602d, 602e, 602f. Three upper and lower coil turns are depicted in FIG. 6 for purposes of explanation, however, embodiments of the invention are not limited to three coil turns, and the number of coil turns may vary from implementation to implementation. The write data rate performance of magnetic writer 600 should be expected to exceed the write data rate of conventional writer 200 (FIG. 2), as well as the write data rate of magnetic writer 300, but at the expense of manufacturing complexity.

The upper coil portions 602a, 602b, 602c of magnetic writer 600 are configured and manufactured the same as, or similar to, magnetic writer 300 (FIG. 3). As magnetic writer 600 includes stacked lower coil portions 602d, 602e, 602f rather than a conventional lower coil portions 202d, 202e, 202f (FIG. 2), the same or similar method of manufacturing (e.g., FIG. 4) stacked upper coil portions 602a, 602b, 602c (and 302a, 302b, 302c) can be applied to the stacked lower coil portions 602d, 602e, 602f. Therefore, the stacked lower coil of writer 600 also comprises ALD-deposited alumina layers 314d, 314e, 314f, for insulation purposes, over each of the respective lower coil portions 602d, 602e, 602f.

A Third Stacked Coil Configuration

Figure 7:
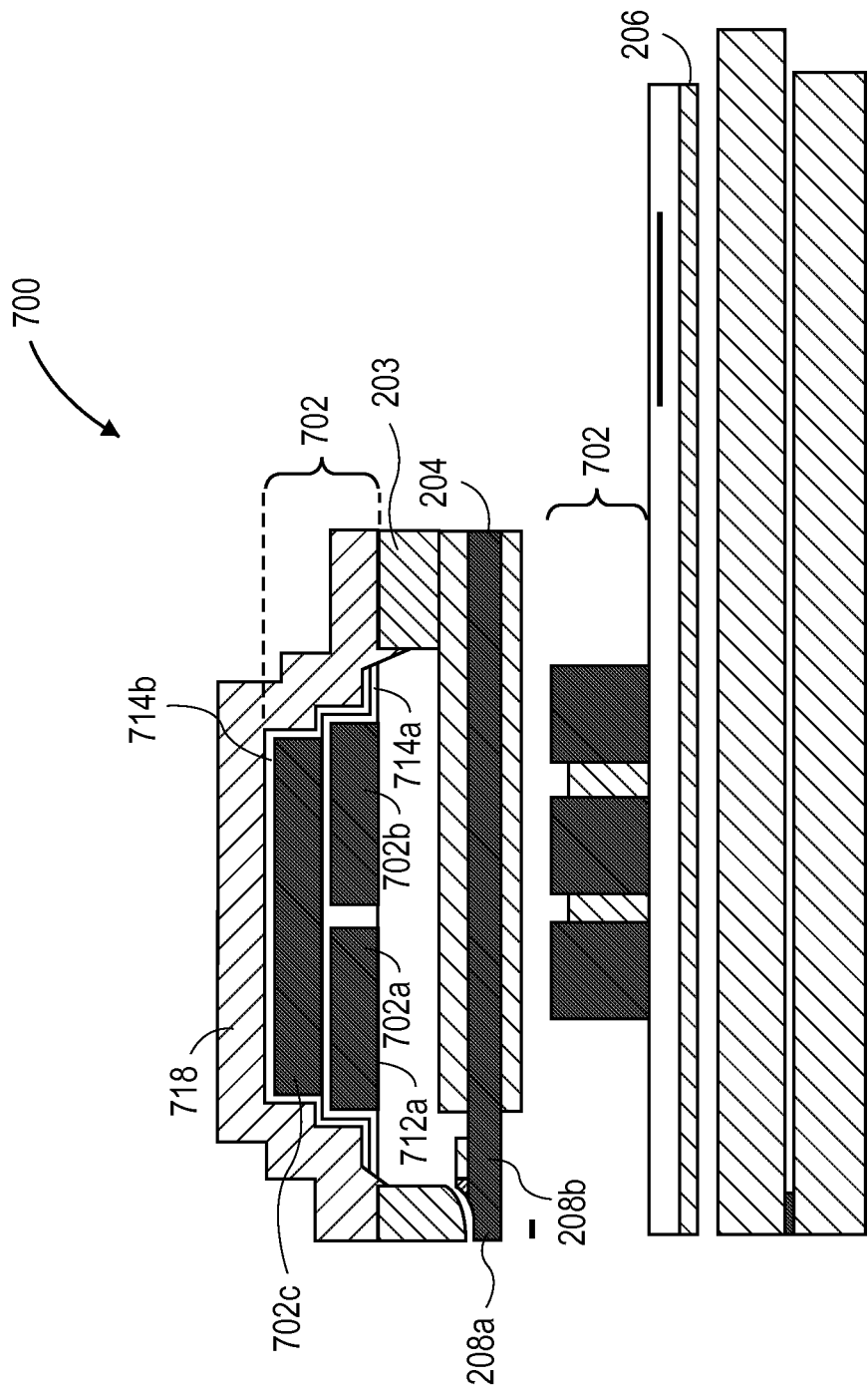
FIG. 7 is a cross-sectional side view of an upper stacked coil magnetic writer, according to a third embodiment of the invention.

FIG. 7 is a cross-sectional side view of an upper stacked coil magnetic writer, according to a third embodiment of the invention.

Magnetic writer 700 comprises a main pole 204 having a pole tip 208a and a yoke 208b, a lower return pole 206, an upper return pole 718, and a stacked coil 702. Stacked coil 702 comprises a plurality of stacked upper coil portions 702a, 702b, 702c, and a plurality of lower coil portions. Three upper and lower coil turns are depicted in FIG. 7 for purposes of explanation, however, embodiments of the invention are not limited to three coil turns, and the number of coil turns may vary from implementation to implementation.

Upper coil portions 702a, 702b, 702c are referred to as a "stacked" configuration, because one or more coil turn in the direction away from the main pole is stacked on the preceding one or more coil turn which is closer to the main pole. Therefore, successive layers of one or more coil turn are supported by a preceding layer of one or more coil turn, with a very thin layer of alumina insulation between each layer of coil, providing a structural foundation for successively manufactured layer(s) of one or more coil turn. Not only does this stacked configuration provide a practical, readily manufacturable configuration for a short yoke length write head, because it can be configured to need and use less space along the direction of the main pole toward the ABS, but it also concentrates more of the coil structure (and, thus, more current) closer to the main pole tip 208a than does the conventional coil configuration shown in FIG. 2. Both of the foregoing features provide for a higher data rate, i.e., faster, write head in comparison with the coil configuration shown in FIG. 2.

Figure 8:
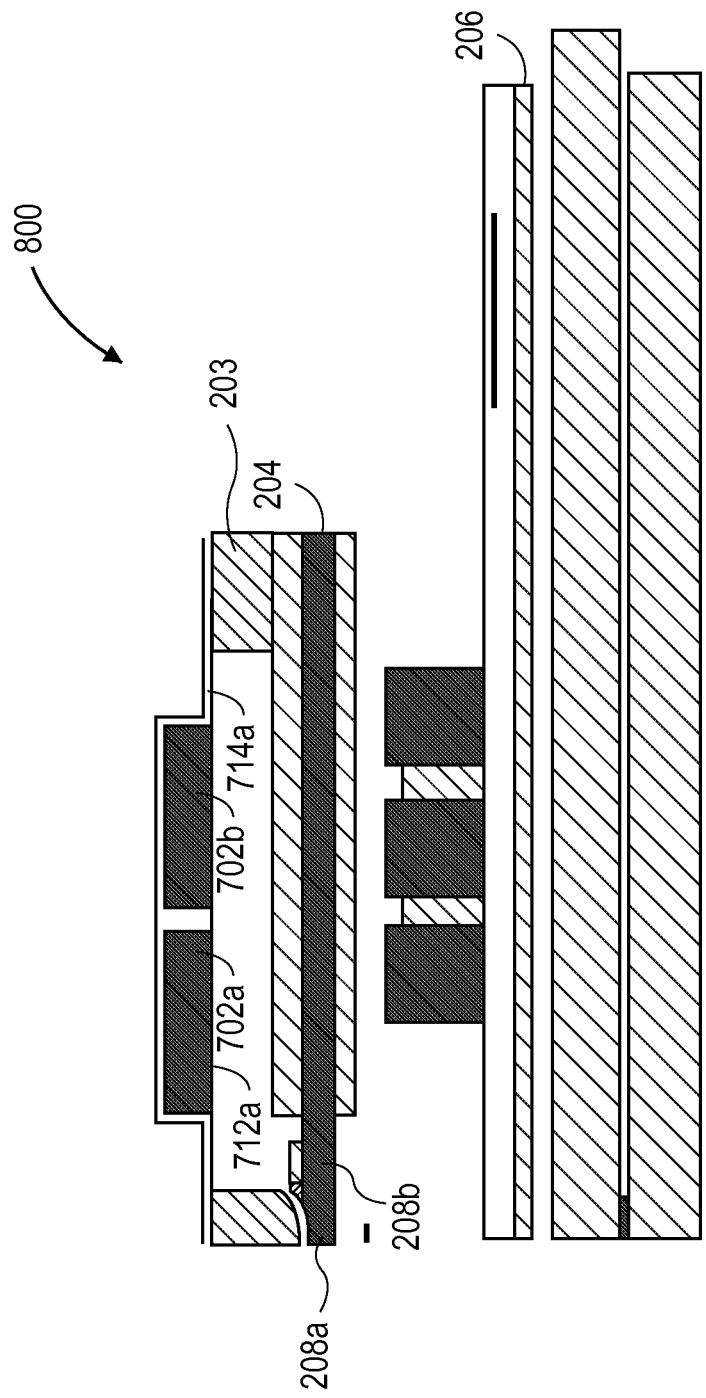
FIG. 8 is a cross-sectional side view of a first stage of an upper stacked coil magnetic writer, according to the third embodiment of the invention.

FIG. 8 is a cross-sectional side view of a first stage of an upper stacked coil magnetic writer, according to the third embodiment of the invention. The same or similar process as illustrated in FIG. 4 can be used to manufacture magnetic writer 700 (FIG. 7). That is, to lay down the first layer of upper coil portions, i.e., upper coil portion 702a and upper coil portion 702b, a similar process as that depicted in FIG. 4 may be followed. As such, a first plating seed layer 712a is deposited (similar to block 402), a photolithographic process is applied to this first seed layer to enable plating of upper coil portions 702a and 702b on a portion of the first seed layer (similar to block 404), and each of the copper coil leads 702a, 702b is plated on the portion of the first seed layer from which seed material was previously removed (similar to block 406). Similarly, the remainder of the seed layer is removed (similar to block 408), and an alumina layer 714a is deposited over the first layer of coil leads 702a, 702b using atomic layer deposition (ALD) process (similar to block 410).

After this first stage of the manufacturing process of writer 700 (FIG. 7), the apparatus is now in the form of partial writer 800 of FIG. 8. To lay down any additional stacked upper coil portions, such as upper coil portion 702c (FIG. 7), a similar process as that depicted in FIG. 4 follows. Alumina which covered the lower coil contact area is removed first. As such, a second plating seed layer is deposited over the alumina layer 714a (similar to block 402), a photolithographic process is applied to this second seed layer to enable plating of upper coil portion 702c on a portion of the second seed layer (similar to block 404), and copper coil lead 702c is plated on the portion of the second seed layer opened by the photolithographic process (similar to block 406). Similarly, the remainder of the seed layer is removed (similar to block 408), and an alumina layer 714b is deposited over the coil lead 702c using atomic layer deposition (ALD) process (similar to block 410). Each upper coil portion 702a, 702b, 702c is connected to one or more corresponding lower coil portion via one or more electrically conductive tab, thereby completing an electrically contiguous coil structure.

Once upper coil portion 702c is plated and covered in alumina layer 714b, then upper return pole 718 is manufactured similarly as described in reference to FIG. 3, whereby a NiFe plating seed layer is deposited over alumina layer 714b and a photolithographic process applied to the seed layer to prepare it for the plating process. A soft magnetic, conformal, upper return pole 718 is then plated over the seed layer. Use of ALD process for the alumina layers provides for highly conformal alumina layers 714a, 714b, and, likewise, for a highly conformal upper return pole 718, which provides an optimally short return path for the magnetic flux which further enhances the write data rate of writer 700.

Alternative Stacked Coil Configurations

Figure 9:
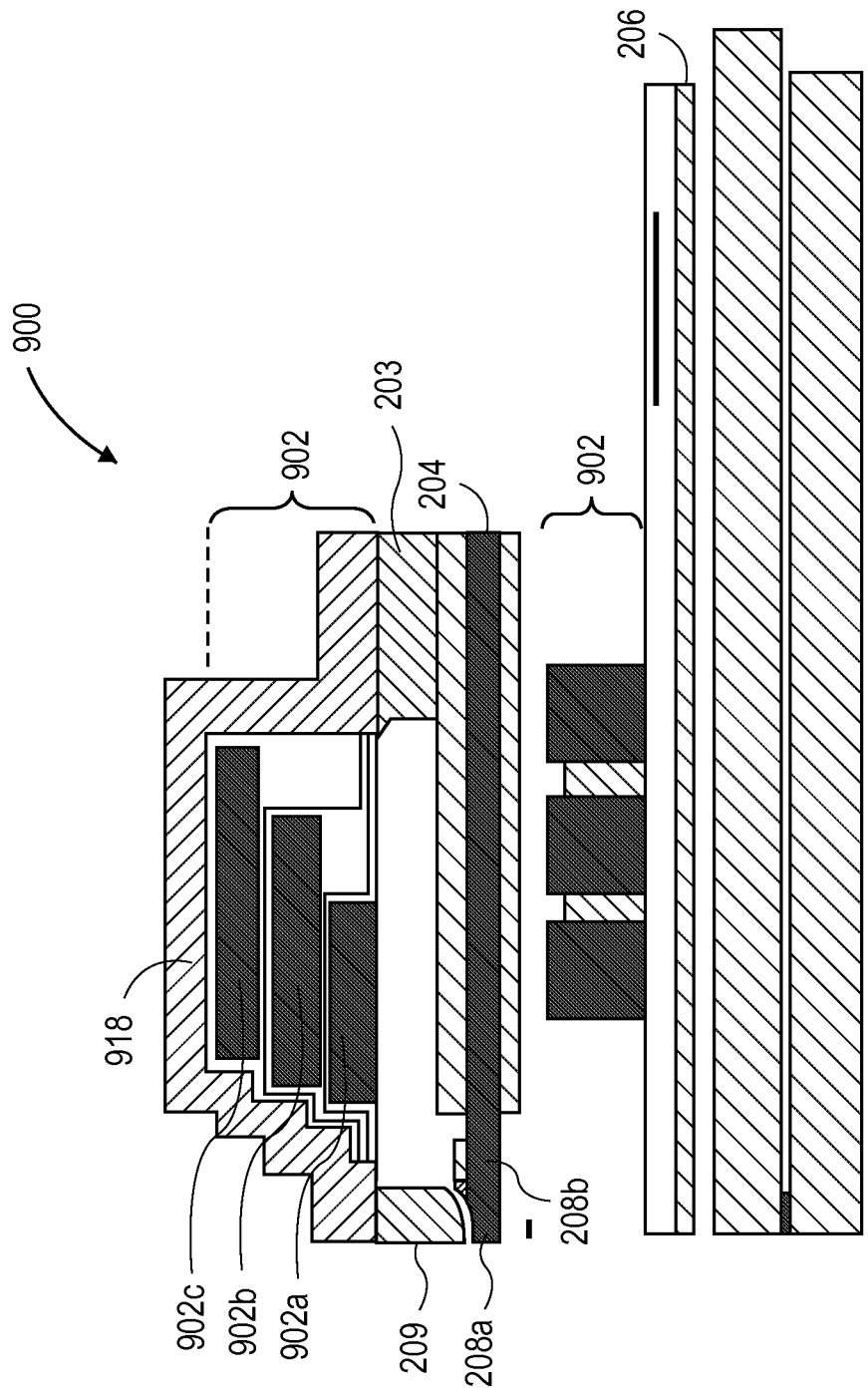
FIG. 9 is a cross-sectional side view of an upper stacked coil magnetic writer, according to a fourth embodiment of the invention.

FIG. 9 is a cross-sectional side view of an upper stacked coil magnetic writer, according to a fourth embodiment of the invention. Magnetic writer 900 comprises a main pole 204 having a pole tip 208a and a yoke 208b, a lower return pole 206, an upper return pole 918, and a stacked coil 902. Stacked coil 902 comprises a plurality of stacked upper coil portions 902a, 902b, 902c, and a plurality of lower coil portions. Three upper and lower coil turns are depicted in FIG. 9 for purposes of explanation, however, embodiments of the invention are not limited to three coil turns, and the number of coil turns may vary from implementation to implementation. Upper coil portions 902a, 902b, 902c are referred to as a "stacked" configuration, because one or more coil turn in the direction away from the main pole is stacked on the preceding one or more coil turn which is closer to the main pole. Therefore, successive layers of one or more coil turn are supported by a preceding layer of one or more coil turn, with a very thin layer of alumina insulation between each layer of coil, providing a structural foundation for successively manufactured layer(s) of one or more coil turn.

For writer 900, each upper coil portion 902a, 902b, 902c has a proximate end that is proximate to the air bearing surface (the left hand side of FIG. 9), and each successive upper coil portion away from write pole 204 has a larger cross-section than the previous upper coil portion. For example, coil portion 902c has a larger and wider cross-section than coil portion 902b, which has a larger and wider cross-section than 902a. Further according to the embodiment of FIG. 9, the proximate end of each said successive upper coil portion is farther away from the air bearing surface than the proximate end of the previous upper coil portion. For example, coil portion 902c is farther from the ABS than coil portion 902b, which is farther from the ABS than 902a. Thus, coil portion 902a has more of its current closer to the ABS and, hence, closer to the pole tip 208a, which maximizes writing efficiency. Additionally, coil portion 902c has some of its current close to the ABS and pole tip 208a, increasing its writing efficiency, but also has a larger cross-section to reduce the overall electrical resistance of the coil 902. Therefore, coil 902c strikes a balance between its contribution to writing efficiency and coil resistance.

A similar process as illustrated in FIG. 4 can be used to manufacture magnetic writer 900. That is, to lay down the successive layers of upper coil portions, i.e., upper coil portion 902a and then upper coil portion 902b and then upper coil portion 902c, a similar process as that depicted in FIG. 4 may be followed, with some process modification as needed to create support for the top coil portion overhanging beyond the bottom coil. Then upper return pole 918 is manufactured similarly as described in reference to FIG. 3.

Figure 10:
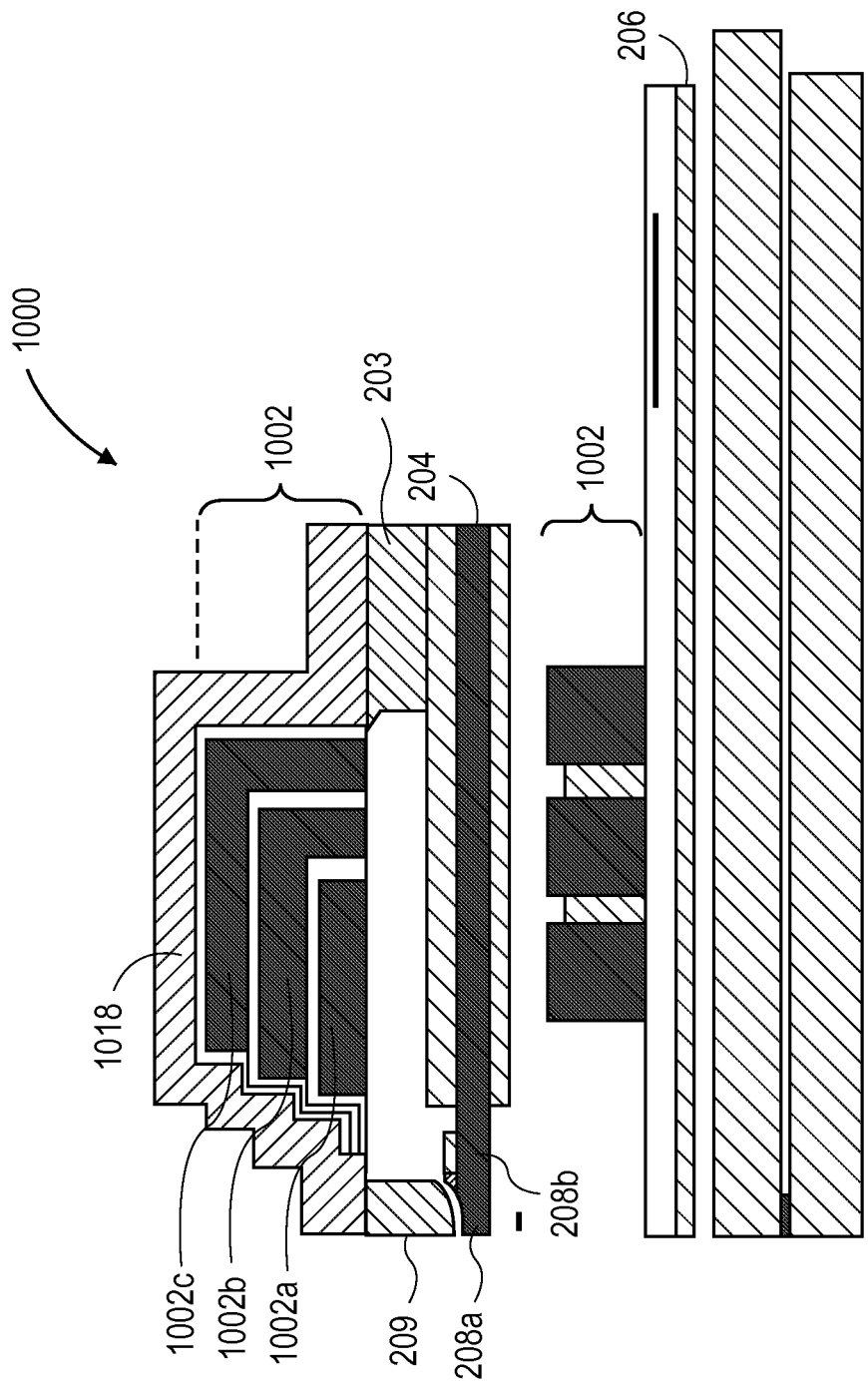
FIG. 10 is a cross-sectional side view of an upper stacked coil magnetic writer, according to a fifth embodiment of the invention.

FIG. 10 is a cross-sectional side view of an upper stacked coil magnetic writer, according to a fifth embodiment of the invention. Magnetic writer 1000 comprises a main pole 204 having a pole tip 208a and a yoke 208b, a lower return pole 206, an upper return pole 1018, and a stacked coil 1002. Stacked coil 1002 comprises a plurality of stacked upper coil portions 1002a, 1002b, 1002c, and a plurality of lower coil portions. Three upper and lower coil turns are depicted in FIG. 10 for purposes of explanation, however, embodiments of the invention are not limited to three coil turns, and the number of coil turns may vary from implementation to implementation. Upper coil portions 1002a, 1002b, 1002c are referred to as a "stacked" configuration, because one or more coil turn in the direction away from the main pole is stacked on the preceding one or more coil turn which is closer to the main pole. Therefore, successive layers of one or more coil turn are supported by a preceding layer of one or more coil turn, with a very thin layer of alumina insulation between each layer of coil, providing a structural foundation for successively manufactured layer(s) of one or more coil turn.

For writer 1000, each upper coil portion 1002a, 1002b, 1002c is similar to each corresponding upper coil portion 902a, 902b, 902c (FIG. 9) because each successive upper coil portion away from write pole 204 has a larger cross-sectional area than the previous upper coil portion. For example, coil portion 1002c has a larger and wider cross-section than coil portion 1002b, which has a larger and wider cross-section than 1002a. Also, the proximate end of each successive upper coil portion 1002a, 1002b, 1002c is farther away from the air bearing surface than the proximate end of the previous upper coil portion. For example, coil portion 1002c is farther from the ABS than coil portion 1002b, which is farther from the ABS than 1002a. Further for writer 1000, one or more of the upper coil portions 1002a, 1002b, 1002c comprises a leg extending in the direction of the write pole 204.

Thus, coil portion 1002a has more of its current closer to the ABS and, hence, closer to the pole tip 208a, which maximizes writing efficiency. Additionally, coil portion 1002c has some of its current close to the ABS and pole tip 208a, increasing its writing efficiency, but also has a larger cross-section to reduce the overall electrical resistance of the coil 1002. Therefore, coil 1002c strikes a balance between its contribution to writing efficiency and coil resistance.

A similar process as illustrated in FIG. 4 can be used to manufacture magnetic writer 1000. That is, to lay down the successive layers of upper coil portions, i.e., upper coil portion 1002a and then upper coil portion 1002b and then upper coil portion 1002c, a similar process as that depicted in FIG. 4 may be followed. Then upper return pole 1018 is manufactured similarly as described in reference to FIG. 3.

Figure 11:
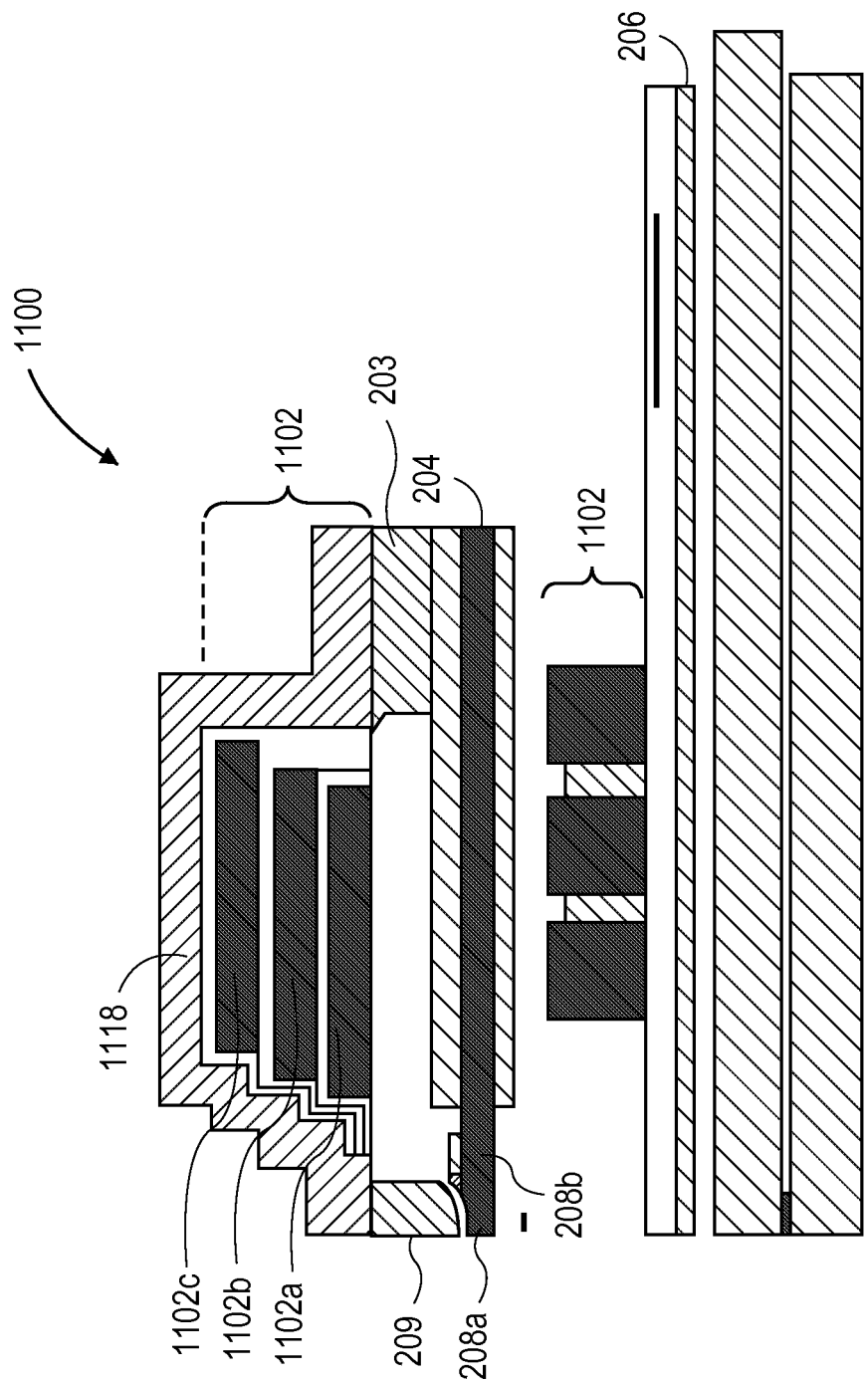
FIG. 11 is a cross-sectional side view of an upper stacked coil magnetic writer, according to a sixth embodiment of the invention.

FIG. 11 is a cross-sectional side view of an upper stacked coil magnetic writer, according to a sixth embodiment of the invention. Magnetic writer 1100 comprises a main pole 204 having a pole tip 208a and a yoke 208b, a lower return pole 206, an upper return pole 1118, and a stacked coil 1102. Stacked coil 1102 comprises a plurality of stacked upper coil portions 1102a, 1102b, 1102c, and a plurality of lower coil portions. Three upper and lower coil turns are depicted in FIG. 11 for purposes of explanation, however, embodiments of the invention are not limited to three coil turns, and the number of coil turns may vary from implementation to implementation. Upper coil portions 1102a, 1102b, 1102c are referred to as a "stacked" configuration, because one or more coil turn in the direction away from the main pole is stacked on the preceding one or more coil turn which is closer to the main pole. Therefore, successive layers of one or more coil turn are supported by a preceding layer of one or more coil turn, with a very thin layer of alumina insulation between each layer of coil, providing a structural foundation for successively manufactured layer(s) of one or more coil turn.

For writer 1100, each upper coil portion 1102a, 1102b, 1102c is similar to each corresponding upper coil portion 902a, 902b, 902c (FIG. 9) because the proximate end of each successive upper coil portion 1102a, 1102b, 1102c is farther away from the air bearing surface than the proximate end of the previous upper coil portion. For example, coil portion 1102c is farther from the ABS than coil portion 1102b, which is farther from the ABS than 1102a. By contrast with upper coil portions 902a, 902b, 902c, for writer 1100 each said upper coil portion has an approximate equal cross-sectional area.

A similar process as illustrated in FIG. 4 can be used to manufacture magnetic writer 1100. That is, to lay down the successive layers of upper coil portions, i.e., upper coil portion 1102a and then upper coil portion 1102b and then upper coil portion 1102c, a similar process as that depicted in FIG. 4 may be followed, with some process modification as needed to create support for the top coil portion overhanging beyond the bottom coil. Then upper return pole 1118 is manufactured similarly as described in reference to FIG. 3.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A magnetic write head comprising:
    a magnetic write pole extending to an air bearing surface;
    at least one magnetic return pole, magnetically connected with said write pole in a region removed from said air bearing surface;
    a write coil arranged around said write pole so as to induce a magnetic flux in said write pole when electrical current flows through said write coil, said write coil comprising:
        a plurality of lower coil portions positioned on a first side of said write pole;
        a plurality of upper coil portions in a stacked configuration in a direction away from said write pole and positioned on a second side of said write pole opposing said first side, wherein each of said plurality of upper coil portions has a rectangular cross section in which a width in a direction parallel to said write pole exceeds a height in a direction away from said write pole; and
        a plurality of electrically conductive tabs each connecting a lower coil portion with an upper coil portion.

2. The magnetic write head of claim 1,
    wherein said lower coil portions are in a stacked configuration in a direction away from said write pole.

3. The magnetic write head of claim 1, further comprising:
    an alumina layer between adjacently stacked upper coil portions.

4. The magnetic write head of claim 3,
    wherein the structure of said alumina layer is atomic layer deposited onto a stacked upper coil portion.

5. The magnetic write head of claim 1, further comprising:
    an upper return pole plated over said plurality of upper coil portions and having a shape patterned from the outer perimeter shape of said stacked configuration.

6. The magnetic write head of claim 1, further comprising:
    wherein each successive upper coil portion configured away from said write pole has a smaller cross-sectional area than its predecessor upper coil portion.

7. The magnetic write head of claim 6, further comprising:
    an upper return pole plated over said plurality of upper coil portions and having a shape patterned from the outer perimeter shape of said stacked configuration.

8. The magnetic write head of claim 1,
    wherein a first layer of said upper coil portions comprises a plurality of coil portions; and
    wherein a second layer of upper coil portions on said first layer of upper coil portions comprises at least one fewer coil portion than said first layer of upper coil portions.

9. The magnetic write head of claim 8,
    wherein each of said second layer of upper coil portions overlaps at least a portion of two of said first layer of upper coil portions.

10. The magnetic write head of claim 1,
    wherein a first layer of said upper coil portions comprises a plurality of coil portions; and
    wherein a second layer of upper coil portions on said first layer of upper coil portions comprises a single coil portion.

11. The magnetic write head of claim 1,
    wherein each said upper coil portion has a proximal end that is proximate to said air bearing surface;
    wherein each successive upper coil portion configured away from said write pole has a larger cross-section than its predecessor upper coil portion; and
    wherein said proximal end of each said successive upper coil portion is positioned farther from said air bearing surface than said proximal end of its predecessor upper coil portion.

12. The magnetic write head of claim 1,
    wherein each of said upper coil portions is substantially planar.

13. The magnetic write head of claim 1,
    wherein each said upper coil portion has an approximate equal cross-section and has a proximal end that is proximate to said air bearing surface; and
    wherein said proximal end of each said successive upper coil portion is positioned farther from said air bearing surface than said proximal end of its predecessor upper coil portion.

14. A hard disk drive, comprising:
    a head slider comprising a magnetic write head;
    a magnetic-recording disk rotatably mounted on a spindle;
    a voice coil motor configured to move the head slider to access portions of the magnetic-recording disk; and
    wherein said write head comprises:
        a magnetic write pole extending to an air bearing surface;
        at least one magnetic return pole, magnetically connected with said write pole in a region removed from said air bearing surface;
        a write coil arranged around said write pole so as to induce a magnetic flux in said write pole when electrical current flows through said write coil, said write coil comprising:
            a plurality of lower coil portions positioned on a first side of said write pole;
            a plurality of upper coil portions in a stacked configuration in a direction away from said write pole and positioned on a second side of said write pole opposing said first side,
wherein each of said plurality of upper coil portions has a rectangular cross section in which a width in a direction arallel to said write sole exceeds a height in a direction away from said write pole; and
a plurality of electrically conductive tabs each connecting a lower coil portion with an upper coil portion.

15. The hard disk drive of claim 14, further comprising:
an alumina layer between adjacently stacked upper coil portions, wherein said alumina layer is atomic layer deposited onto each stacked upper coil portion; and
an upper return pole plated over said plurality of stacked upper coil portions and having a shape patterned from the outer perimeter shape of said stacked configuration.

16. A magnetic write head comprising:
a magnetic write pole extending to an air bearing surface;
at least one magnetic return pole, magnetically connected with said write pole in a region removed from said air bearing surface;
a write coil arranged around said write pole so as to induce a magnetic flux in said write pole when electrical current flows through said write coil, said write coil comprising:
a plurality of lower coil portions positioned on a first side of said write pole,
a plurality of upper coil portions in a stacked configuration positioned on a second side of said write pole opposing said first side, and
a plurality of electrically conductive tabs each connecting a lower coil portion with an upper coil portion,
wherein each successive upper coil portion configured away from said write pole has a smaller cross-sectional area than its predecessor upper coil portion.

17. The magnetic write head of claim 16, further comprising:
an upper return pole plated over said plurality of upper coil portions and having a shape conformal to said stacked configuration.

18. The magnetic write head of claim 16,
wherein said lower coil portions are in a stacked configuration in which each successive lower coil portion configured away from said write pole has a larger cross-sectional area than its predecessor lower coil portion.

19. A magnetic write head comprising:
a magnetic write pole extending to an air bearing surface;
at least one magnetic return pole, magnetically connected with said write pole in a region removed from said air bearing surface;
a write coil arranged around said write pole so as to induce a magnetic flux in said write pole when electrical current flows through said write coil, said write coil comprising:
a plurality of lower coil portions positioned on a first side of said write pole,
a plurality of upper coil portions in a stacked configuration positioned on a second side of said write pole opposing said first side, and
a plurality of electrically conductive tabs each connecting a lower coil portion with an upper coil portion,
wherein each said upper coil portion has an approximate equal cross-section and has a proximal end that is proximate to said air bearing surface, and
wherein said proximal end of each said successive upper coil portion is positioned farther from said air bearing surface than said proximal end of its predecessor upper coil portion.

20. A magnetic write head comprising:
a magnetic write pole extending to an air bearing surface;
at least one magnetic return pole, magnetically connected with said write pole in a region removed from said air bearing surface;
a write coil arranged around said write pole so as to induce a magnetic flux in said write pole when electrical current flows through said write coil, said write coil comprising:
a plurality of lower coil portions positioned on a first side of said write pole,
a plurality of upper coil portions in a stacked configuration positioned on a second side of said write pole opposing said first side, each upper coil portion having a proximal end that is proximate to said air bearing surface and a distal end opposing said proximal end, and
a plurality of electrically conductive tabs each connecting a lower coil portion with an upper coil portion,
wherein one or more of said upper coil portions comprises a leg, at said distal end, extending in the direction of said write pole.

21. A method for manufacturing a magnetic write head, the method comprising:
depositing a plating seed layer over a magnetic write pole and a plurality of lower coil portions;
applying a photolithographic process on said seed layer to enable plating of a coil portion on a portion of said seed layer;
electroplating a rectangular copper coil portion on said portion of said seed layer, wherein said rectangular copper coil portion has a width in a direction parallel to said seed layer and a height in a direction normal to said seed layer, and wherein said width exceeds said height;
removing said seed layer other than said portion of said seed layer;
depositing alumina over said coil portion using atomic layer deposition;
depositing a second plating seed layer over said alumina;
applying a photolithographic process on said second seed layer to enable plating of a coil portion on a portion of said second seed layer;
electroplating a second rectangular copper coil portion on said portion of said second seed layer, wherein said second rectangular copper coil portion has a width in a direction parallel to said seed layer and a height in a direction normal to said seed layer, and wherein said width exceeds said height;
electrically connecting each rectangular copper coil portion with at least one of said lower coil portions via respective electrically conductive tabs;
removing said second seed layer other than said portion of said second seed layer;
depositing alumina over said second coil portion using atomic layer deposition;
removing said alumina from an area of a wrap-around shield an area of a back gap;
depositing a NiFe seed layer over said alumina;
applying a photolithographic process on said NiFe seed layer to enable plating of an upper return pole on a portion of said NiFe seed layer; and
plating a soft magnetic upper return pole on said portion of said NiFe seed layer and magnetically connecting said upper return pole with said write pole.

22. The method of claim 21, wherein plating said upper return pole comprises plating an upper return pole having a shape patterned from an outer perimeter shape of said rectangular copper coil portions.

* * * * *

UNITED STATES PATENT AND TRADEMARK OFFICE
CERTIFICATE OF CORRECTION

PATENT NO. : 9,183,853 B2
APPLICATION NO. : 13/867019
DATED : November 10, 2015
INVENTOR(S) : Hsiao et al.

Page 1 of 1

It is certified that error appears in the above-identified patent and that said Letters Patent is hereby corrected as shown below:

In the claims

Column 13, line 5, claim 14 replace "in a direction arallel to said write sole" with "in a direction parallel with said write pole".

Column 14, lines 46-48, claim 21 replace "in a direction parallel to said seed layer and a height in a direction normal to said seed layer" with "in a direction parallel to said second seed layer and a height in a direction normal to said second seed layer".

Column 14, lines 58-59, claim 21 replace "an area of a wrap-around shield an area of a back gap" with "an area of a wrap-around shield and an area of a back gap".

Signed and Sealed this
Twenty-sixth Day of April, 2016

Michelle K. Lee
*Director of the United States Patent and Trademark Office*